United States Patent
Lopez et al.

(10) Patent No.: US 10,694,482 B2
(45) Date of Patent: Jun. 23, 2020

(54) SYSTEM FOR BROADCASTING A TEMPORAL REFERENCE IN AN AIRCRAFT

(71) Applicant: AIRBUS OPERATIONS (S.A.S.), Toulouse (FR)

(72) Inventors: Juan Lopez, Grenade (FR); Valentin Kretzschmar, Pechbonnieu (FR); Emilie Claudel, Leguevin (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 16/192,580

(22) Filed: Nov. 15, 2018

(65) Prior Publication Data
US 2019/0208486 A1 Jul. 4, 2019

(30) Foreign Application Priority Data
Nov. 21, 2017 (FR) .................... 17 60989

(51) Int. Cl.
*H04J 3/06* (2006.01)
*H04W 56/00* (2009.01)
*H04B 7/185* (2006.01)
*H04W 4/42* (2018.01)
*H04W 4/48* (2018.01)

(52) U.S. Cl.
CPC .... *H04W 56/0015* (2013.01); *H04B 7/18506* (2013.01); *H04W 4/42* (2018.02); *H04W 4/48* (2018.02)

(58) Field of Classification Search
CPC ........... H04W 56/001; H04W 56/0015; H04W 56/00; H04W 76/14; H04L 5/0048
See application file for complete search history.

(56) References Cited

U.S. PATENT DOCUMENTS

| | | | | |
|---|---|---|---|---|
| 6,885,661 | B1* | 4/2005 | Hopper | H04J 3/1605 370/354 |
| 2006/0062143 | A1* | 3/2006 | Bibby | G05D 1/0077 370/225 |
| 2007/0261052 | A1* | 11/2007 | Bale | G06F 8/60 717/174 |
| 2007/0266119 | A1* | 11/2007 | Ohly | H04J 3/0664 709/220 |
| 2011/0060483 | A1* | 3/2011 | Gine I Cortiella | G01C 21/00 701/3 |
| 2013/0003620 | A1* | 1/2013 | Dame | H01Q 1/007 370/310 |
| 2015/0256247 | A1* | 9/2015 | Haley | H04B 7/18563 455/12.1 |
| 2016/0037287 | A1* | 2/2016 | Kim | H04W 8/005 455/456.1 |

(Continued)

OTHER PUBLICATIONS

Search Report for FR1760989 dated Jul. 18, 2018, 7 pages.
Canada, "War on Wiring", Aerospace America (May 2017).

*Primary Examiner* — Atique Ahmed
(74) *Attorney, Agent, or Firm* — Nixon & Vanderhye P.C.

(57) ABSTRACT

A system for broadcasting an avionics temporal reference over a set of devices (7) of an aircraft, the system includes a master clock (5) configured to broadcast the avionics temporal reference via a wireless communication network (3) according to at least one predetermined frequency belonging to a wireless avionics intra-communication frequency band.

13 Claims, 5 Drawing Sheets

(56) References Cited

U.S. PATENT DOCUMENTS

| | | | |
|---|---|---|---|
| 2016/0054425 A1* | 2/2016 | Katz | G01S 3/14 |
| | | | 342/417 |
| 2016/0173830 A1* | 6/2016 | Watanabe | H04N 5/23245 |
| | | | 348/143 |
| 2017/0134499 A1* | 5/2017 | Moyer | H04N 21/2146 |
| 2017/0180072 A1* | 6/2017 | Timm | G01S 13/34 |
| 2017/0230916 A1* | 8/2017 | Stein | H02J 50/20 |
| 2019/0208485 A1* | 7/2019 | North | H04B 7/18506 |

\* cited by examiner

SYSTEM FOR BROADCASTING A TEMPORAL REFERENCE IN AN AIRCRAFT

RELATED APPLICATION

This application claims priority to French Patent Application 1760989 filed Nov. 21, 2017, the entirety of which is incorporated by reference.

TECHNICAL FIELD

The present invention relates to the broadcasting via a wireless communication of a temporal reference over a set of devices of an avionics system of an aircraft.

BACKGROUND

Distribution of the temporal reference on an avionics platform of an aircraft conventionally may include several clock sources. Generally, there exist three clock sources adapted to generate and determine the temporal reference of the aircraft. The first source is a precise primary source arising from a GPS (Global Positioning System) satellite geolocation system integrated in general into a reception device called a Multi Mode Receiver MMR. The signal arising from the primary source is used as an input for the other two sources which are secondary sources. The secondary sources comprise Air Data Inertial Reference Units ADIRUs and optionally an LRU (Line Replaceable Unit) device of which the dedicated function is to distribute a clock: "LRU-Clock".

The distribution of the temporal reference is carried out through an avionics network of deterministic switched Ethernet type, in accordance with the ARINC 664 standard, part 7. Such a network can for example correspond to an AFDX® communication network. The communications in the network are carried out on virtual links and each virtual link has a reserved end-to-end path through the network. Distribution of the temporal reference passes via a secure gateway named SCI (Secured Communication Interface) hosting a function dedicated to distribution.

However, for operational reasons certain devices receive a temporal reference through a specific bus and/or gateway. The choice of distribution depends on the validity and availability of the source. Furthermore, other devices can use yet other sources for maintenance needs through the SCI gateway. All these various sources and gateways increase the complexity of the architecture of the avionics platform and of the distribution function.

Moreover, due to the fact that the devices involved in this architecture are asynchronous and taking account of the latency times induced by the various gateways, the lag in forwarding the temporal reference is non-negligible and the inferred precision is limited. For example, the path linking the primary source (GPS), the secondary source (ADIRU-LRU-Clock), the AFDX network and the SCI gateway induces a latency of the order of a second. In case of fault of the LRU-Clock clock, the latency will be about double.

Furthermore, the multiplicity of sources and the complexity of the architecture decrease the optimization of the initialization time necessary for distribution of the temporal reference. Moreover, in case of partial or temporary loss of the platform or of the devices, the temporal reference may no longer be available.

SUMMARY

The invention disclosed herein may be embodied as a system for broadcasting a temporal reference over a set of devices of an aircraft. The system may remedy the aforementioned drawbacks, minimize transport latency and simplify implementation while increasing precision and the reliability of a common temporal reference.

An inventive system has been conceived and is disclosed herein for broadcasting an avionics temporal reference over a set of devices of an aircraft, the system comprising a master clock configured to broadcast the avionics temporal reference (for example in a periodic manner) via a wireless communication network according to at least one predetermined frequency belonging to a frequency band dedicated to wireless internal avionics communications (WAIC).

This broadcasting system is robust and simple to implement, allowing the various avionics devices and regardless of their positions in the aircraft to share one and the same temporal reference in a reliable and precise manner. More particularly, by relying on an RF transmission, this broadcasting system decreases the transport latency and ensures quasi-simultaneity of reception of the temporal reference by the various devices, thus decreasing the effects of dispersions among the subscribers to the master clock. Furthermore, the simplicity of this configuration allows optimal initialization management and continuous availability of the temporal reference.

The master clock may be configured to receive the avionics temporal reference from an avionics multimode reception apparatus (such as a Multi Mode Receiver—MMR) configured to generate the reference time according to a satellite geolocation. The master clock can be a dedicated device linked to the MMR apparatus via a standard wired connection of Ethernet type or can be integrated into the MMR apparatus.

According to a first embodiment of the invention, the master clock is configured to use a time synchronization protocol on a wireless avionics network.

According to a second embodiment of the invention, the master clock is configured to emit the temporal reference by radio wave (amplitude- or frequency-modulated) of which the frequency of the carrier wave lies in a bandwidth of the wireless avionics intra-communication frequencies. The radio wave is used to synchronize internal clocks included in the devices on the temporal reference.

These embodiments provide a simple to implement and allows for reduced errors in the use of a temporal reference. Moreover, these embodiments are simple, robust and less costly than using a GPS time decoder.

The internal clock of each device may include an apparatus for regulation (of quartz type) and time-setting.

The invention may be embodied as an avionics system comprising the broadcasting system according to any one of the previous characteristics, furthermore comprising the set of devices adapted to receive the avionics temporal reference, each device being configured to couple a reception value of the temporal reference with its internal clock so as to deduce a common avionics reference time.

The master clock may be configured to emit the temporal reference on first and second pathways according to respectively first and second predetermined frequencies included in the WAIC wireless avionics intra-communication frequency band and in that each of the devices comprises a manager of redundancy of the first and second pathways.

Thus, in case of loss of the information of the temporal reference on the first pathway, the receiver devices will use the second pathway as a pathway of recourse or backup pathway.

The redundancy manager may be configured to operate according to a predetermined management logic selected from among any one of the following logics:

the temporal reference used corresponds to that received first via the first pathway or the second pathway, the temporal reference used corresponds to that received via a single pathway selected from among the first and second pathways and in case of signal loss on the selected pathway, then the temporal reference used corresponds to that received via the remaining pathway, and the temporal reference received corresponds to an average of those received via the first and second pathways and in case of signal loss on one of the pathways, then only the temporal reference received via the remaining pathway is used.

The invention also envisages an aircraft comprising an avionics system according to any one of the characteristics hereinabove.

The invention may also be embodied as a method for broadcasting an avionics temporal reference over a set of devices of an aircraft, comprising a broadcasting of the avionics temporal reference via a wireless communication according to at least one predetermined frequency belonging to a frequency band dedicated to WAIC wireless internal avionics communications.

DESCRIPTION OF THE DRAWINGS

Other characteristics and advantages of the invention will become apparent on reading preferential embodiments of the invention which are given with reference to the attached figures among which.

DETAILED DISCLOSURE OF EMBODIMENTS

The concept underpinning the invention is the non-deterministic broadcasting of a common temporal reference on an avionics platform via a wireless communication.

Figure 1:
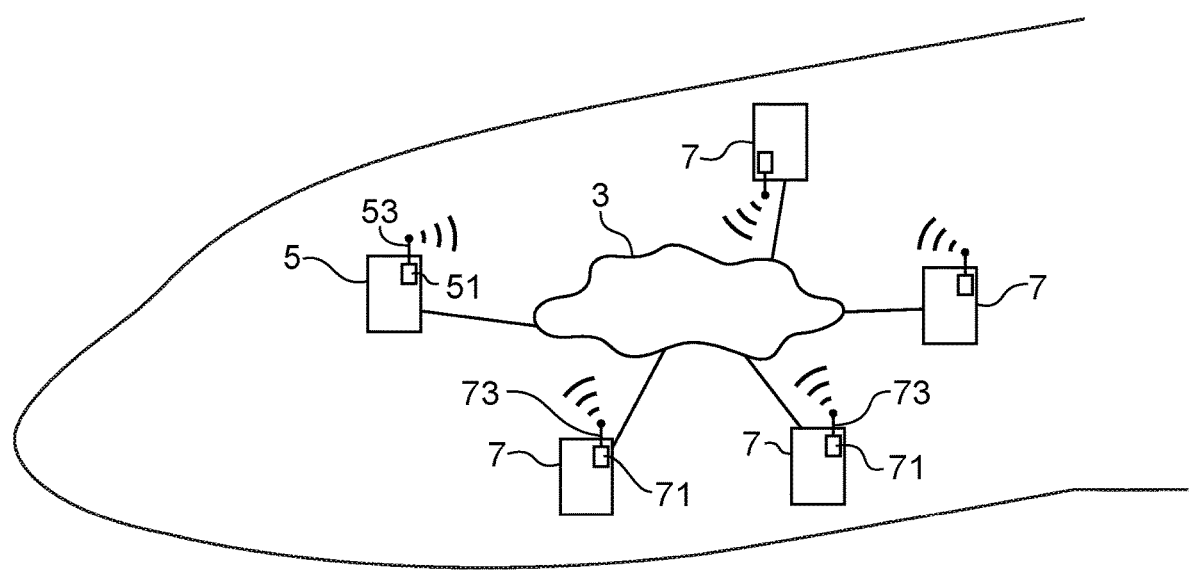
FIG. 1 represents in a schematic manner a system for broadcasting via a wireless communication an avionics temporal reference over a set of devices of an aircraft, according to one embodiment of the invention.

FIG. 1 represents in a schematic manner a system for broadcasting via a wireless communication an avionics temporal reference over a set of devices of an aircraft, according to one embodiment of the invention.

The wireless communication system is a Wireless Avionics Intra-Communication system (i.e. a system dedicated to avionics communications) called WAIC. The WAIC is intended for radiocommunication between avionics components on board one and the same aircraft. Thus, it is a closed wireless communication network exclusive to each aircraft. It is intended for radiocommunications solely between components inside the aircraft. It uses a frequency band lying between 4200 MHz and 4400 MHz.

In accordance with the invention, the broadcasting system 1 comprises a master clock 5 configured to broadcast an avionics temporal reference over a set of devices 7 of an aircraft via a WAIC wireless avionics intra-communication network 3. The broadcasting of the avionics temporal reference is carried out according to at least one predetermined frequency for example lying between about 4 200 MHz and 4 400 MHz belonging to the frequency band of the WAIC wireless avionics intra-communication network 3. The temporal reference is thus distributed in a precise and reliable manner to all the subscribed devices 7, regardless of their position in the aircraft.

The master clock 5 sends a temporal reference, e.g., a clock signal, to an emitter 51 comprising an antenna 53 which are configured to emit signals via the wireless network 3, in frequencies in the WAIC frequency band. Likewise, each of the subscribed devices 7 comprises a receiver 71 with an antenna 73 tuned to receive the signal of the temporal reference from the master clock 5. Thus, the broadcasting system 1 includes the master clock 5 and the receivers 71 which communicate with various electronic devices 7 of the aircraft.

The master clock 5 is configured to transmit, via the emitter 51, the avionics temporal reference in a periodic manner, for example at 500 ms (millisecond) intervals. The antenna 73 for the devices 7 receive the temporal reference also in a periodic manner.

The temporal reference is received periodically by each of the various devices 7 of the aircraft after a short delay (temporal offset) with respect to the time of transmission of the temporal reference. Each device 7 is configured to account for the delay when calibrating its internal clock to the temporal reference. In this manner, all devices 7 have internal clocks that operate based on a common reference time based on the temporal reference.

Figure 2:
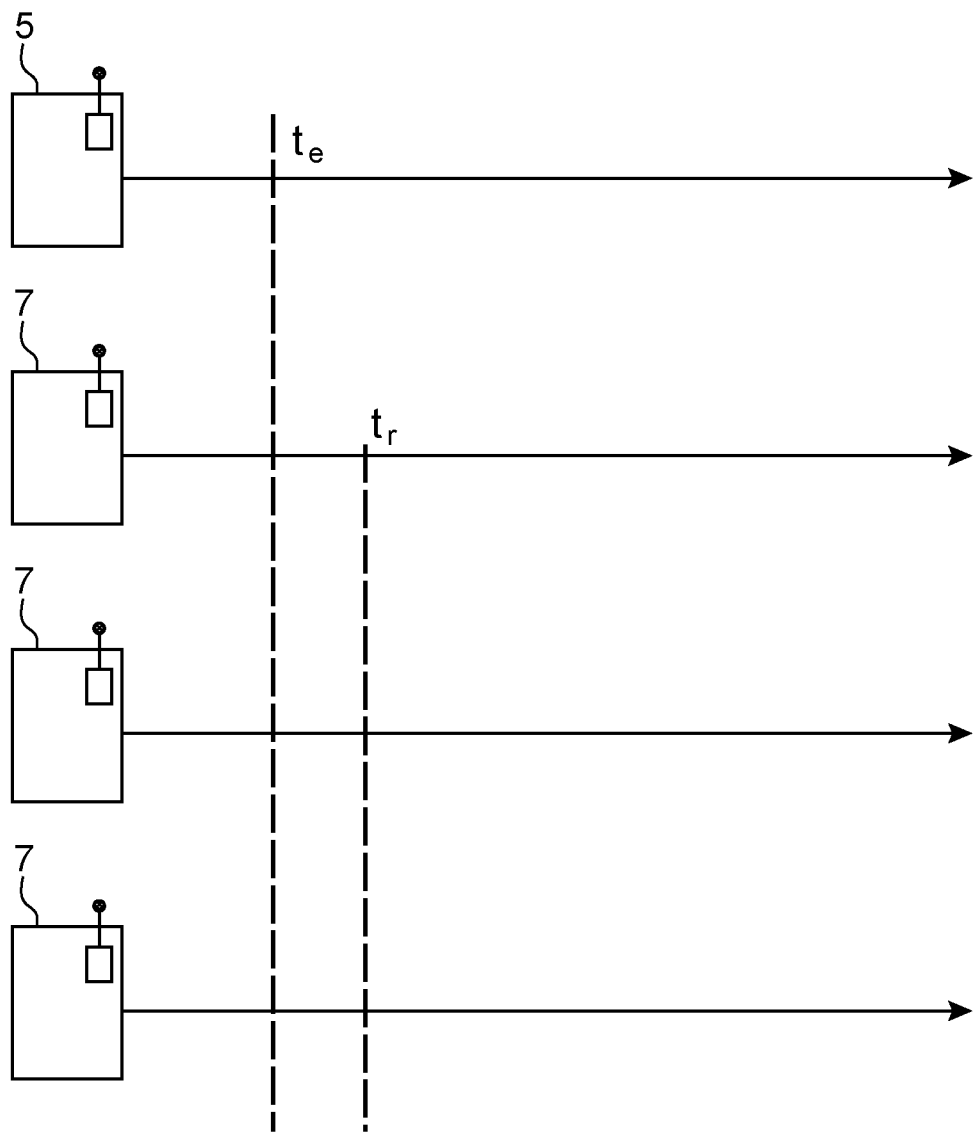
FIG. 2 illustrates in a schematic manner the time of reception of the temporal reference by a set of devices, according to one embodiment of the invention.

FIG. 2 illustrates in a schematic manner the time of reception of the temporal reference by a set of devices 7. The temporal offset (latency time) is the delay between the time of transmission $t_e$ of the emitter 51 of the temporal reference generated by the master clock and the times of reception $t_r$ by the various devices 7 of the temporal reference. The latency time $(t_r-t_e)$ may vary slightly between the different devices 7.

The latency time is less than a microsecond given that the speed of propagation of the signal emitted by the master clock 5 is $3 \times 10^8$ m/s (meters per second). For any aircraft, the latency time should always be less than 0.3 microseconds. Moreover, the high signal propagation speed allows for an assumption that the various devices 7 receive the temporal reference quasi-simultaneously. The calculation of the latency time may be reduced to using a constant latency time period, such as a period less than 0.3 microseconds, when determining the common reference time in each of the devices 7.

Figure 3:
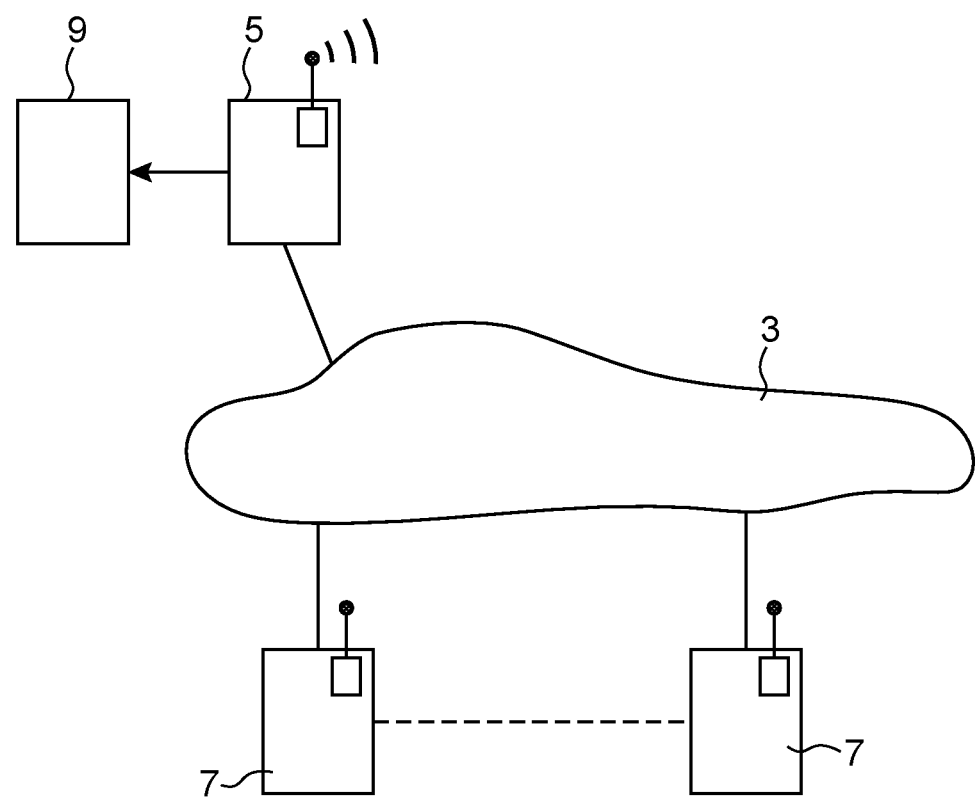
FIG. 3 represents in a schematic manner an avionics system comprising the broadcasting system, according to a first embodiment of the invention.

FIG. 3 represents in a schematic manner an avionics system comprising the broadcasting system. The avionics system may include an avionics platform with the master clock 5, the set of electronic devices 7 each of which has an internal clock, the wireless communication network (WAIC) and a multimode reception apparatus 9, such as a (Multi Mode Receiver (MMR).

The multimode reception apparatus 9 is configured to generate the reference time on the basis of a satellite geolocation system of GPS type. The master clock 5 is configured to receive the avionics temporal reference from the MMR 9 and to periodically broadcast the temporal reference over the set of devices 7 via the WAIC wireless avionics intra-communication network 3.

The MMR 9 is thus the reference datum for the master clock 5. The master clock may be integrated into the MMR apparatus 9. Alternatively, the master clock 5 may be a dedicated device linked to the MMR apparatus via a standard wired connection of Ethernet, ARINC 429, or other network protocol type FIG. 3 shows the master clock 5 configured to use a time synchronization protocol on the WAIC wireless avionics intra-communication network 3. The synchronization protocol is similar to those used on conventional computing networks of the SNTP (Simple Network Time Protocol), PTP (Precision Time Protocol), RBS (Reference Broadcast Time Synchronization) type which are customarily defined for technologies of the WIFI type.

The addressing is carried out by broadcasting according to the "Broadcasted" mode by relying on standard communication protocols such as ZIGBee, WIFI, etc. while adapting the frequencies to those of the WAIC wireless avionics intra-communication network and while complying with the expected performance constraints relating to, for example, the number of subscribers, the distance to be covered, etc.

Figure 4:
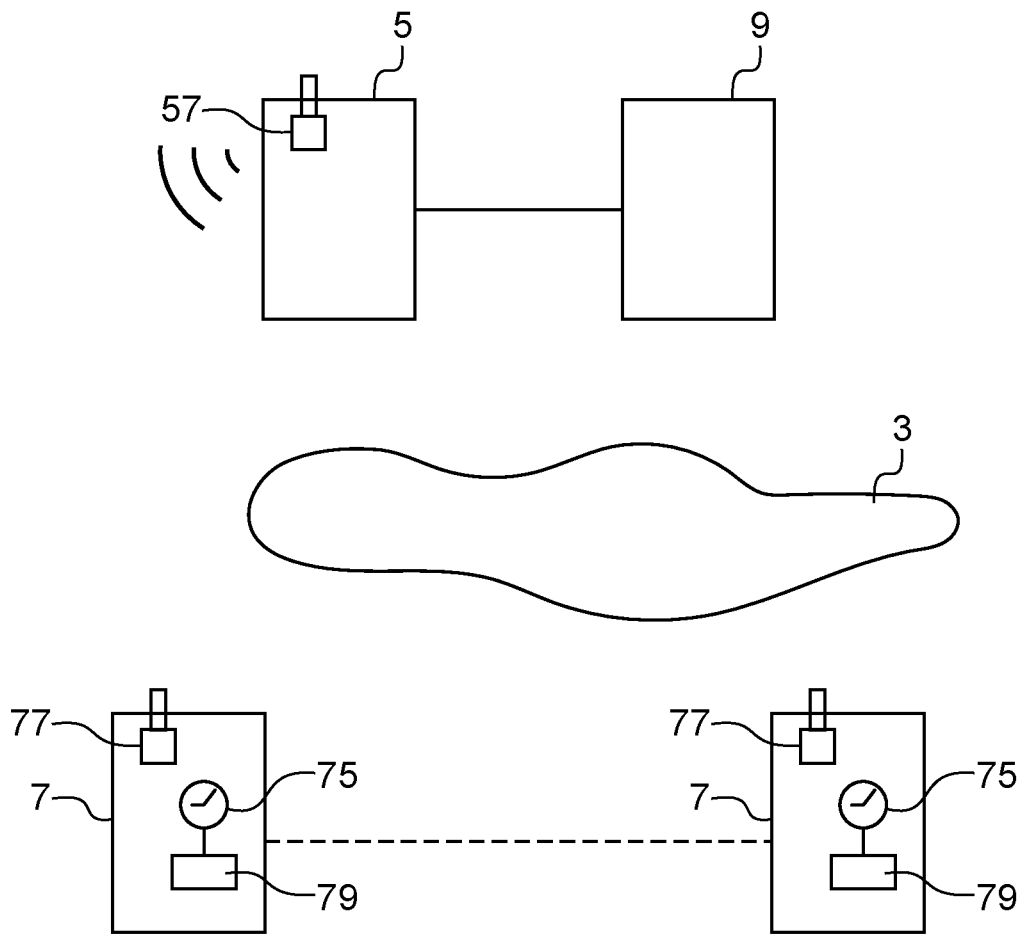
FIG. 4 represents in a schematic manner an avionics system comprising the broadcasting system, according to a second embodiment of the invention.

FIG. 4 represents in a schematic manner an avionics system comprising the broadcasting system, according to a second embodiment of the invention.

The master clock 5 may include a radio emitter 57 configured to emit a temporal reference of the "universal time" UTC (Universal Time Coordinate) type by radio wave of which the frequency of the carrier lies in the bandwidth of the WAIC wireless avionics intra-communication network.

The radio wave can be implemented according to an amplitude modulation or a phase modulation and is configured to control the internal clocks 75 included in the devices 7 so as to synchronize them to the temporal reference. The subscribed devices 7 comprise receivers 77 for receiving the radio signal.

The MMR 9 always may remain the reference datum for the master clock 5 and the master clock may be integrated into the MMR apparatus 9 or linked to the MMR apparatus via a wired connection.

Using the MMR 9 to provide a reference datum to the master clock 5 employs an approach to synchronize the master clock to the reference datum that is similar to conventional approaches of radio-controlled clocks which are synchronized to a time signal emitted by a radio-control time station such as the German system "DCF77" for time reference distribution at 77.5 kHz or the French system "ANFR" (Agence National des Fréquences) at 162 kHz.

The internal clock 75 of each device 7 may comprise a conventional apparatus for regulation 79 and time-setting of quartz type. This optionally makes it possible to carry out corrections with the aid of the radio signal so as to alleviate the loss of signal reception in case of lightning or other undesirable electromagnetic effects.

Figure 5:
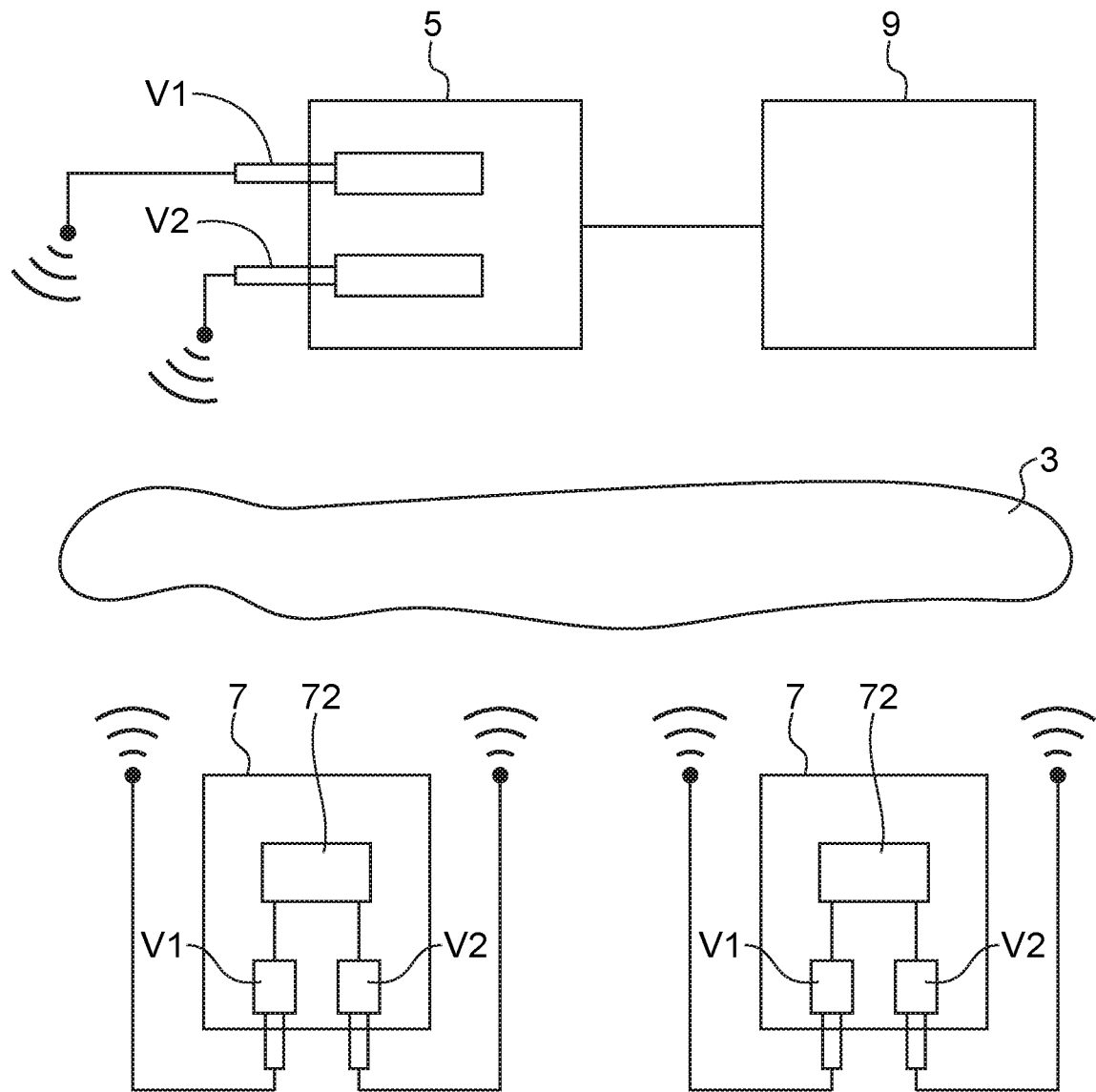
FIG. 5 represents in a schematic manner an avionics system comprising the broadcasting system, according to a particular embodiment of the invention.

FIG. 5 represents in a schematic manner an avionics system comprising the broadcasting system, according to a particular embodiment of the invention. It will be noted that this embodiment applies to the first and second modes of FIGS. 3 and 4.

According to this particular embodiment, the master clock 5 is configured to emit the temporal reference on both of first and second pathways V1 and V2 according to respectively first and second predetermined frequencies F1 and F2 included in the frequency band of the WAIC wireless avionics intra-communication network 3.

Furthermore, each of the devices 7 comprises a manager of redundancy 72 of these first and second pathways V1, V2. The redundancy manager 72 is adapted to select the valid pathway in case of anomaly on one of the two pathways V1, V2.

The redundancy manager 72 may be configured to operate according to a predetermined management logic. The management logic may be configured such that the temporal reference used by the device 7 corresponds to that received first via either the first pathway V1 or the second pathway V2. Thus, if the first clock time obtained is that of the first pathway V1 at the frequency F1, then this first time is selected by the redundancy manager 72 to be used by the device 7.

The management logic may be configured such that the temporal reference correspond to that received via a single pathway selected from among the first and second pathways V1, V2.

If there is a signal loss on the selected pathway, the temporal reference received from the other pathway V2, V1, may be used by the device 7. For example, the only pathway customarily used may be the first pathway V1 (according to the frequency F1) and if this first pathway V1 is lost, then, the redundancy manager 72 uses the second pathway V2 according to the frequency F2.

The temporal reference received may correspond to an average time value of the temporal references received via the first and second pathways V1, V2. If the signal is lost on one of these pathways, then temporal reference will be the reference received via the remaining pathway.

The redundancy manager 72 may calculate the average of the first temporal reference received via the first pathway V1 and of the second temporal reference received via the second pathway V2. If one of the two pathways is lost, the redundancy manager may select the pathway which remains valid and use the received temporal reference without averaging.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A system for broadcasting an avionics temporal reference in an aircraft, the system comprising:
    an avionics multimode reception apparatus configured to generate a reference time according to a satellite geolocation;
    a master clock in the aircraft configured to generate the avionics temporal reference using the reference time and to wirelessly broadcast the avionics temporal reference to avionics devices linked by a wireless communication network for the aircraft,
    wherein the master clock is configured to broadcast the temporal reference on first and second wireless pathways according to respectively first and second predetermined frequencies included in a frequency band dedicated to wireless internal avionics communications within the wireless communication network and wherein the temporal reference is applied to synchronize internal clocks in the avionics devices.

2. The system according to claim 1, wherein the master clock is configured to use a time synchronization protocol on the wireless avionics network.

3. The system according to claim 1, wherein the master clock is configured to emit the avionics temporal reference by radio wave of which a frequency of a carrier for the radio wave lies in the frequency band dedicated to the wireless internal avionics communications.

4. The system according to claim 1, wherein the internal clock of each of the avionics devices comprises an apparatus configured for regulation and time-setting.

5. The system accordingly to claim 1, wherein the avionics devices are adapted to receive the avionics temporal reference, and each of the avionics devices is configured to couple a reception value of the avionics temporal reference with the internal clock of the avionics device to deduce a common avionics reference time.

6. The system according to claim 5, wherein each of the avionics devices comprises a redundancy manager configured to account for redundancy of the first and second wireless pathways.

7. The system according to claim 1, wherein the frequency band dedicated to the wireless internal avionics communications is a wireless avionics intra communication frequency band.

8. The system according to claim 6, wherein the redundancy manager is configured to operate according to a predetermined management logic including at least one of:
the avionics temporal reference used corresponds to that received first via the first wireless pathway or the second wireless pathway,
the avionics temporal reference used corresponds to that received via a single wireless pathway selected from among the first and second wireless pathways and in case of signal loss on the single wireless pathway, then the avionics temporal reference used corresponds to that received via the first or second wireless pathways which is not the single wireless pathway, and
the avionics temporal reference received corresponds to an average of the avionics temporal reference received via the first wireless pathway and the avionics temporal reference received via the second wireless pathway, and in case of signal loss on one of the first and second wireless pathways, then only the avionics temporal reference received via another of the first and second wireless pathway is used.

9. An aircraft comprising the system according to claim 5.

10. A method to broadcast an avionics temporal reference over a set of avionics devices in an aircraft, the method comprising: generating, by an avionics multimode reception apparatus in the aircraft, a reference time based on a satellite geolocation;
generating, by a master clock in an avionics device in the aircraft, the avionics temporal reference based on the reference time;
broadcasting of the avionics temporal reference via a wireless communication network in the aircraft on first and second wireless pathways according to respectively first and second predetermined frequencies included in a frequency band dedicated to wireless internal avionics communications within in the aircraft;
receiving by avionics devices in the wireless communication network the avionics temporal reference via the first and second wireless pathways, and
synchronizing clocks in each of the avionics devices using the avionics temporal reference.

11. A method to synchronize clocks in avionics devices in a wireless communication network in an aircraft, the method comprises:
generating, by an avionics multimode reception apparatus, a reference time based on a satellite geolocation;
generating, by a master clock in an avionics platform of the aircraft, a temporal reference signal based on the reference time;
outputting the temporal reference signal by the master clock;
periodically transmitting wirelessly the temporal reference signal over at least two frequencies in a frequency band dedicated to wireless internal avionics communication network in the aircraft;
receiving the temporal reference signal transmitted wirelessly by receivers in each of the avionics devices, wherein each of the receivers receive the temporal reference signal over the at least two frequencies;
synchronizing internal clocks in each of the avionics devices using the temporal reference signal.

12. The method of claim 11 further comprising:
each of the avionics devices averaging the temporal reference signals received over the at least two frequencies to generate an averaged temporal reference signal;
using the averaged temporal signal to perform the synchronization of each of the internal clocks in the avionics devices; and
if the temporal signal is received over only one of the at least two frequencies at least one of the avionics devices, using the temporal signal received over the only one of the at least two frequencies to perform the synchronization in the internal clock for the at least one of the avionics devices.

13. The method of claim 11, wherein the step of periodically transmitting wirelessly the temporal reference signal is performed at intervals no longer than 500 ms.

* * * * *